United States Patent [19]

Bartoe, Jr.

[11] 4,391,424
[45] Jul. 5, 1983

[54] METHOD AND STRUCTURE FOR AIRFOIL THRUST AND LIFT CONTROL

[75] Inventor: Otto E. Bartoe, Jr., Boulder, Colo.

[73] Assignee: Ball Brothers, Boulder, Colo.

[21] Appl. No.: 718,739

[22] Filed: Aug. 30, 1976

[51] Int. Cl.³ .............................................. B64C 21/08
[52] U.S. Cl. ..................................... 244/207; 244/213; 244/90 A; 244/110 B; 244/52
[58] Field of Search .................. 244/42 CC, 42 P, 113, 244/90 A, 90 R, 110 B, 207, 213, 52

[56] References Cited

U.S. PATENT DOCUMENTS

| | | | |
|---|---|---|---|
| 2,034,218 | 3/1936 | Weick et al. | 244/42 D |
| 2,041,688 | 5/1936 | Barnhart | 244/42 D |
| 2,896,881 | 7/1959 | Attinello | 244/42 CC |
| 2,991,961 | 7/1961 | Rogallo et al. | 244/42 CC |
| 3,262,658 | 7/1966 | Reilly | 244/42 CC |
| 3,276,727 | 10/1966 | Clark | 244/42 CC |
| 3,493,198 | 2/1970 | Röed | 244/110 B |
| 3,807,663 | 4/1974 | Bartoe, Jr. | 244/42 CC |
| 3,874,620 | 4/1975 | Kahler et al. | 244/110 B |
| 3,915,412 | 10/1975 | Tibbs | 244/42 CC |

*Primary Examiner*—Galen L. Barefoot
*Attorney, Agent, or Firm*—O'Rourke & Harris

[57] ABSTRACT

A method and structure for selectively conducting pressurized gas flow over the upper surface of an airfoil, the airflow being selectively directable either rearward through a spanwise outlet to produce thrust and augment lift or, alternatively, directed forward to spoil the aerodynamic flow over the wing to diminish lift and provide a reverse-thrust braking. The structure includes a plenum defined in the airfoil and ducting to receive pressurized air or gas, the plenum being defined in part by a panel longitudinally pivoted at the central portion thereof to, preferably, change the area of a rearward directed opening while concurrently and proportionally changing in the opposite sense the area of a forward oriented opening to selectively direct the pressurized air or gas rearwardly, forwardly, or in combinations of openings while preferably maintaining a substantially constant opening area. Also, an outboard independent portion of each gate may optionally be interconnected to the controls to move in a progressive manner and thus provide a powerful rolling torque, particularly at low airspeeds.

3 Claims, 4 Drawing Figures

METHOD AND STRUCTURE FOR AIRFOIL THRUST AND LIFT CONTROL

BACKGROUND OF THE INVENTION

1. Field of the Invention

The present invention relates generally to airfoil performance augmentation through ducting and flow of pressurized air or gas over the surface of an airfoil, and more specifically pertains to a method and structure for selectively directing such flow either rearward to produce thrust and augment lift, or forward to provide reverse-thrust braking and spoiling of the aerodynamic lift of the airfoil.

2. Description of the Prior Art

Short take-off or landing aircraft (STOL) require, in take-off mode, a highly efficient lift producing airfoil operable with relatively low air speed. Conversely, upon landing, it is desirable that the airfoil be inefficient to transfer more of the aircraft weight to the supporting landing gear and thus enhance the effectiveness of the brakes.

Also, when utilizing turbine power sources the engines at idle provide substantial thrust. Accordingly, it is not unusual to find such turbine driven craft with steady-state taxi speeds in excess of safe speeds unless the brakes are employed continuously during taxiing. Of course such continuous use of the aircraft brakes to control taxi speed is not only awkward, but results in wear of the brakes and degradation of the braking performance if the brakes are overheated during taxi.

A particularly useful STOL aircraft concept is taught in U.S. Pat. No. 3,807,663 issued Apr. 30, 1974. In this patent, airfoil effectiveness and thrust is obtained by blowing an airstream over the airfoil from a spanwise plenum through a rearward facing slot. This airstream is preferably the bypass air from a turbofan engine. Though this concept is particularly effective in enhancing lift and, accordingly, low-speed take-off and flight, the above mentioned idle thrust of the engine continues to augment lift and thus decrease braking efficiency during the landing roll. The cumulative effect of this idle thrust is to produce higher than desirable taxi speeds and reduced braking effectiveness.

Another limitation upon low speed operation of STOL aircraft is the diminished effectiveness of conventional control surfaces at low airspeeds and the accompanying relatively high angle of attack of airfoil.

SUMMARY OF THE INVENTION

The present invention provides a heretofore unavailable method and apparatus for releasing gas under pressure through a directionally controllable aperture contained in an airfoil structure such that said gas or air may be employed for the purpose of either increasing aerodynamic lift on said airfoil structure while producing thrust, or decreasing lift while supplying reverse-thrust. The apparatus comprises an airfoil structure with an internal plenum for ducting gas or air under pressure spanwise through the airfoil. A spanwise aperture is defined on the upper forward surface of the main airfoil and communicating with the plenum. A gate pivotally mounted along the spanwise axis of said assembly is positioned at the aperture and actuated by adjacent means. The gate is thus located so as to control egress of air or gas from the aperture in the forward and/or rearward directions. Independent outboard portions of the gate may be separately moveable by the aircraft controls to provide roll control.

Accordingly, an object of the present invention is to provide a new and improved airfoil structure and method for selectively enhancing aerodynamic lift and producing thrust through utilization of pressurized gas or air channeled through a spanwise aperture in the upper surface of said airfoil structure, or, alternatively by repositioning the gate, spoiling lift and providing a reverse-thrust.

Another object of the present invention is to provide a new and improved airfoil structure and method by effecting a change in direction of the pressurized air or gas exiting an airfoil structure through a spanwise aperture in the upper surface of the structure.

Yet another object of the present invention is to provide a new and improved airfoil structure and method by which pressurized air or gas may be employed to decelerate an airfoil structure through the effect of reverse-thurst, the air or gas being directionally deflected generally opposite the direction of travel of the airfoil by a gate.

Still another object of the present invention is to provide a new and improved airfoil structure and method which, when used as the primary airfoil of an aircraft, imparts a substantially downward thrust to the aircraft, due to pressurized air or gas directed upward from a spanwise aperture in the airfoil structure by a pivoted gate, thereby increasing wheel braking efficiency.

A further object of the present invention is to provide a new and improved airfoil structure and method which provides for selective forward and rearward thrust redirectioning through alternative outlets which cumulatively give a substantially constant area.

A still further object of the present invention is to provide a new and improved airfoil structure and method for providing roll torque in conjunction with favorable yaw by progressively opening an outboard gate on one airfoil to evenly spoil lift on limited areas of the airfoil and concurrently provide a controlled limited thrust reversal.

These and other objects and features of the present invention will become apparent from the following descriptions.

DETAILED DESCRIPTION OF THE INVENTION

Figure 1:
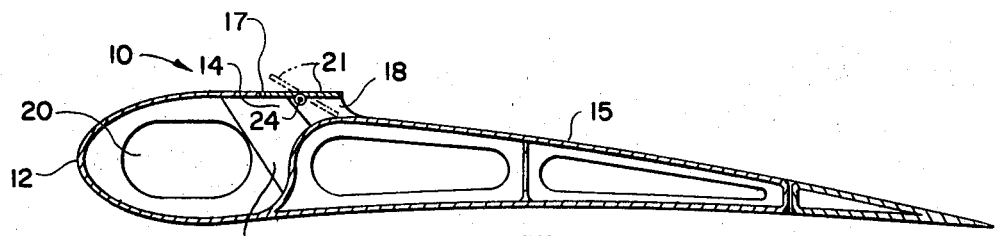
FIG. 1 is a view in cross-section of an airfoil structure illustrating the lift augmentation mode of the present invention.

Turning now to the drawings, wherein like components are designated by like reference numerals throughout the various figures, airfoil 10, having leading edge 12 and upper surface 15, provides a generally smooth exterior surface interrupted only by aperture 14 extending spanwise in the upper surface of airfoil 10. Aperture 14 is defined by rear edge 17 of leading edge member 12 at the forward position and forward edge 18 of upper surface 15. Plenum chamber 20, defined primarily in leading edge 12, is provided to channel pressurized air or gas spanwise through the airfoil 10 to be ultimately expelled through aperture 14. Air or gas may be pressurized either by engine operation or any other auxiliary means. Preferably, as discussed in U.S. Pat. No. 3,807,663, aperture 14 is located approximately 0.2 to 0.33 times the chord of the airfoil 10 from the leading edge of said structure.

In the preferred embodiment illustrated in FIG. 1, airfoil 10 typically includes leading edge member 12 and upper surface 15, but it is to be understood that construction details of the airfoil may vary without noticeable effect on performance. The important quality of airfoil 10 being aperture 14 positioned generally as shown and communicating with plenum chamber 20, or a similar channel for pressurized air or gas. Turning vanes 33 may be used to deflect the flow efficiently from a spanwise to a chordwise direction.

The direction of flow of pressurized air escaping plenum chamber 20 through aperture 14 is controlled by movable gate 21, pivoted around spanwise pivot axis 24 spaced from and substantially parallel to edge 17 of leading edge member 12 in such a way that when arranged in a horizontal position, gate 21 functions as a rearward extension of the upper surface of leading edge 12. Gate 21 is equipped with an actuating assembly 28 allowing rotation about pivot 24, preferably located within airfoil 10 as in FIG. 2. Shaft 26 is attached to gate 21 at a position spaced from pivot axis 24. Gate 21 is movable within limits around pivot axis 24, the limits being horizontal alignment with leading edge member 12, as in FIG. 1, and contact between edge of gate 21 with upper surface 15, as in FIG. 3.

A horizontal alignment of gate 21 with leading edge section 21 essentially extends the upper surface of leading edge member 12 rearward, in effect insuring that pressurized air or gas escaping chamber 20 is guided rearward, in contact with the upper surface 15. FIG. 1 illustrates the preferred placement of gate 21, with the rear edge of gate 21 horizontally overlapping upper surface 15 of airfoil 10. In this mode of operation, airfoil 10 displays meaningful improvement in aerodynamic lift over a basic airfoil shape, by reason of pressurized air moving over upper surface 15. Because air or gas under pressure is supplied to airfoil 10 by means external to airfoil 10, no direct relationship exists between airspeed of the aircraft and air available for improvement of aerodynamic lift, thus allowing full use of the augmentation system in conditions of slow flight, when it is most useful. Additionally, the air or gas employed for purposes of lift supplementation ultimately leaves airfoil 10 in a direction generally opposite the direction of travel of airfoil 10, thereby imparting a portion of its energy toward forward propulsion.

Figure 2:
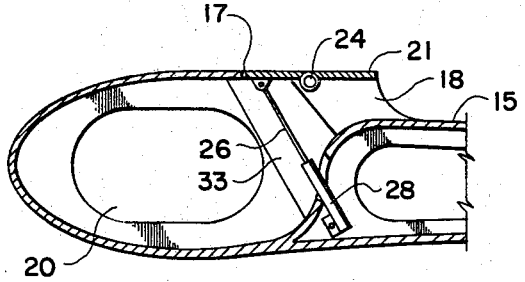
FIG. 2 is a view in cross-section of airfoil structure showing placement of actuating apparatus.

Actuating means for gate 21 are shown in FIG. 2, being comprised of shaft 26 attached to gate 21 forward of pivot 24 and connected to motor 28 such that power applied to motor 28 causes shaft 26 to extend or contract axially. This comprises one method of actuating gate 21 to directionally alter airflow through aperture 14, but mechanisms of other design could be employed to provide similar actuation of the gate.

Figure 3:
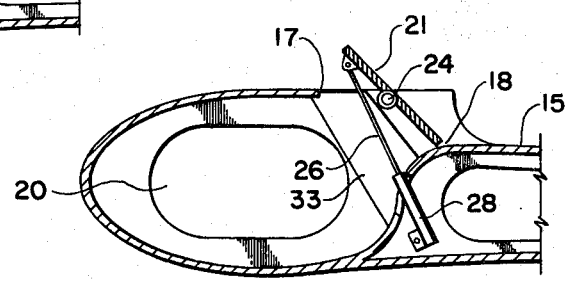
FIG. 3 is a view in cross-section of the airfoil structure in reverse-thrust configuration.

In FIG. 3 gate 21 has been rotated about pivot 24 until the rear edge of gate 21 is in contact with upper surface 15. In this configuration air or gas released from aperture 14 exits in an upward and forward direction.

The pressurized air or gas has, in this case, an effect opposite that of the mode of operation illustrated in FIG. 1 and explained above. The components of force from the released air or gas act to impede normal forward movement. When gate 21 is rotated to the position illustrated in FIG. 3, all lift augmentation on upper surface 15 of main airfoil 10 is cancelled and normal aerodynamic lift generated by forward movement of airfoil 10 is spoiled due to interruption of the airflow by the forward flow of pressurized air or gas. Composite effects of these forces allow an aircraft equipped with airfoil 10, as described here-in, a greater degree of control during high speed ground operations, especially landings. The pressurized air or gas, guided forward by gate 21, exerts a reverse-thrust to aid in deceleration of the craft while simultaneously supplying a downward force to make wheel braking more effective. Decrease of lift on upper surface 15 of main airfoil 10 also contributes to the total downward force acting on the aircraft.

The present invention therefore provides, alternatively, a lift augmentation configuration, as shown in FIG. 1, and a reverse-thrust deceleration configuration, as shown in FIG. 3. Because the singular difference between lift augmentation mode and reverse-thrust mode is the position of pivoted gate 21, all other components of the system, including means of pressurizing and ducting air or gas, remain unchanged regardless of configuration selected. When, as preferred, gate 10 is pivoted centrally, the opening area remains substantially constant since as gate 21 alters the opening size at one edge, the opposite edge of gate 21 changes the opening there defined an equal amount but in the opposite sense.

Figure 4:
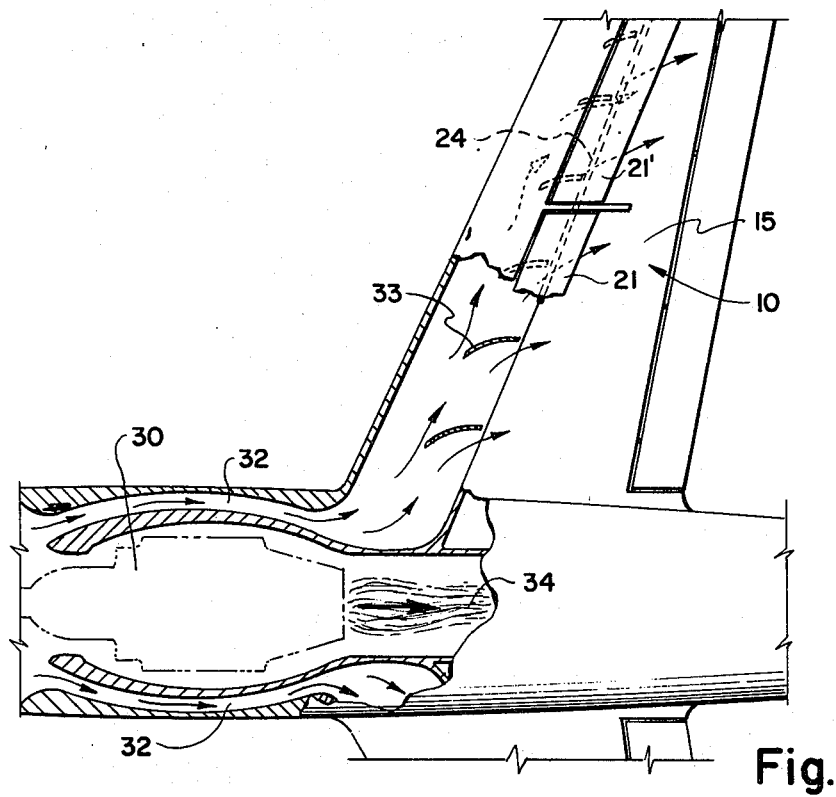
FIG. 4 is a simplified top view partially in cross-section of an aircraft having roll control in accordance with the instant invention.

In the preferred embodiment, as illustrated in FIG. 4, pressurized air or gas is supplied by engine 30 and exits as bypass air from turbine duct 32 while combustion gases are exhausted at outlet 34. Plenum 20 communicates with duct 32 to receive and transmit the bypass air. Operating air or gas could also be pressurized by a system not directly related to engine operation, such as a blower.

In another important embodiment illustrated in FIG. 4, a second gate 21' is provided at the outboard portion of airfoil 10. Gate 21' is actuated in a similar manner as is gate 21, but in response to flight control movement. Thus gate 21' may be smoothly moved to a selected position on one airfoil 10 independent of the other airfoil 10. When gate 21' is opened on a given airfoil 10, localized, outboard lift is spoiled on that airfoil 10 to provide a powerful roll torque even at low aircraft speed. Also, the reverse-thrust produced by the forward opening of gate 21' induces a favorable yaw in the aircraft, in counterdistinction to the adverse yaw induced by, for instance, aileron control surface.

Although only limited specific embodiments of the present invention have been illustrated and described in detail, it is apparent that various changes and modifications will be readily recognized by those skilled in the art, and that such changes and modifications may be made without departing from the scope of the inventions as defined by the following claims.

What is claimed is:

1. In an aircraft airfoil having a plenum chamber defined spanwise therein, means for providing gases under pressure to the plenum, and an elongated outlet defined in the upper surface of the airfoil and in communication with the plenum the improvement comprising, an elongated gate positioned at the outlet and pivotally mounted for movement around an axis substantially parallel to the length of the outlet, the gate extending substantially across the airfoil and being located at the leading portion thereof, means for moving the gate around the axis to selectively define rearward and forward oriented appertures between the gate and the outlet, whereby, by selectively positioning the gate, the gases under pressure in the plenum may be directed either rearward over the airfoil to augment lift and produce thrust, or, alternatively, the gases may be directed forward of the airfoil to spoil lift and provide a reverse-thrust at the leading portion of the wing, said gate is spanwise divided into inboard and outboad sections with the outboard section independently movable relative to the inboard section, and second means are provided for independently moving the outboard section, whereby the outboard section of the gate may be independently moved to produce a rolling torque during flight.

2. An aircraft comprising: a power source adapted to produce gases under pressure through a power source exhaust, airfoils, plenum chambers defined spanwise through the airfoils, ducting means to connect the plenum chambers to at least a portion of the exhaust of the power source, an outlet communicating with the plenum chamber defined in the upper leading surface of each airfoil and extending spanwise across the major portion of the airfoil, a gate positioned in each outlet and spanwise pivoted at the middle of the gate for movement to selectively define rearward and forward oriented apertures between the edge of the gate and the outlet, means for moving each gate to define the apertures, and a portion of each said gate is independently pivoted relative to the remainder of the gate and a second means for moving each independent portion of the gate is provided.

3. A method for selectively generating or spoiling lift and selectively generating roll thrust in an aircraft comprising, generating gases under pressure, ducting the gases under pressure spanwise through an airfoil, exhausting the gases to an outlet defined in the leading upper surface of the airfoil and extending across a major portion of the airfoil, selectively directing the exhausted gases by a gate pivotally mounted in the outlet in the upper surface of the airfoil, moving the gate to define the direction in which the gases are exhausted, and further moving a portion of said gate independently of the remainder of the gate to control thrust direction and lift on a limited area of the airfoil.

* * * * *